United States Patent Office 3,227,410
Patented Jan. 4, 1966

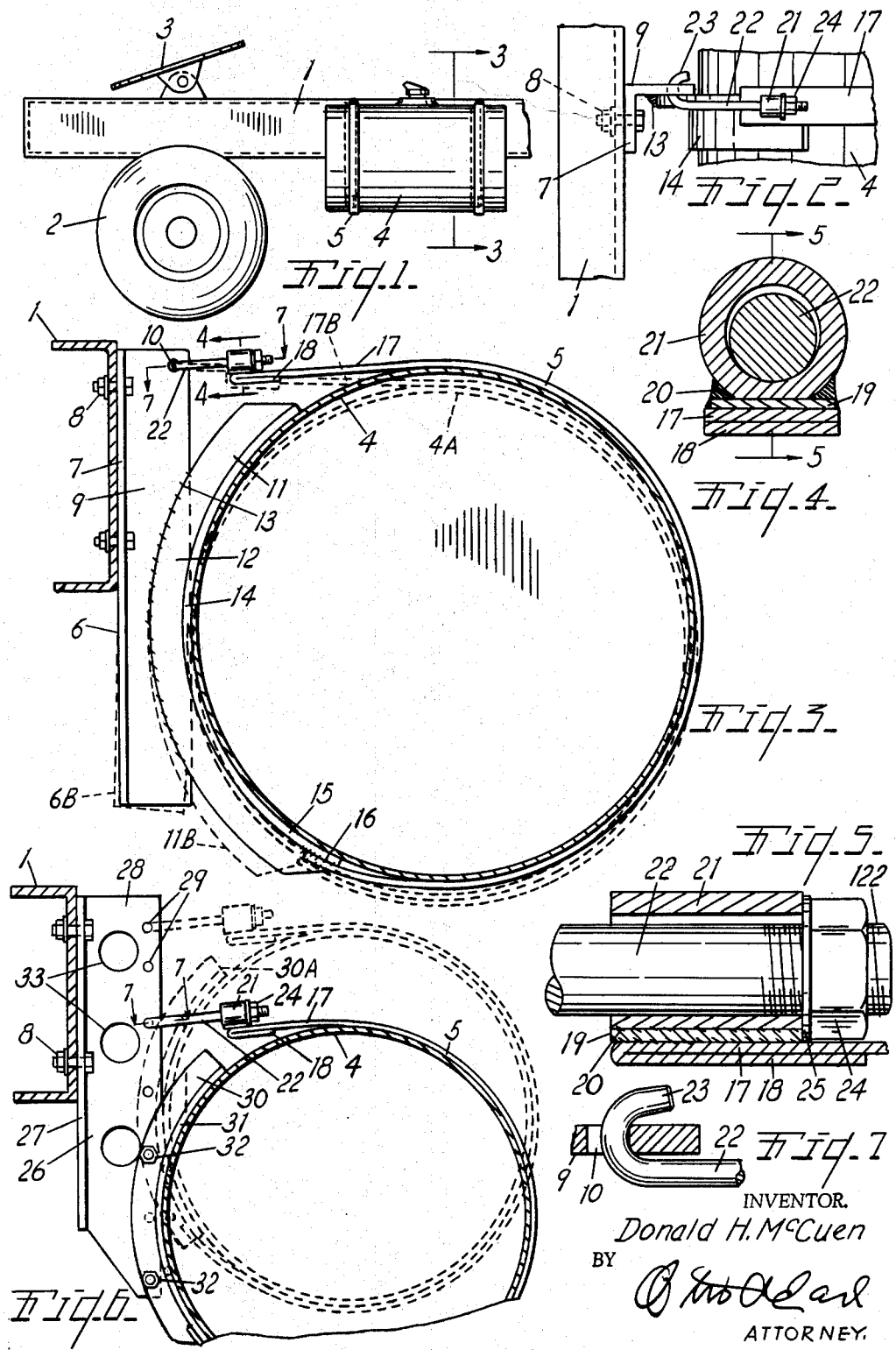

3,227,410
FUEL TANK HANGER FOR TRUCKS
AND VEHICLES
Donald H. McCuen, White Pigeon, Mich., assignor to
Arrow Manufacturing & Sales Company, White Pigeon,
Mich.
Filed Mar. 6, 1964, Ser. No. 349,977
5 Claims. (Cl. 248—201)

This invention relates to improvements in fuel tank hanger for trucks and vehicles. The principal objects of this invention are:

First, to provide a tank hanger for attaching fuel tanks to the frame members of trucks and similar vehicles in which the parts of the supporting hanger are not subjected to flexing and fatigue due to vibration and movement of the tanks supported by the hangers.

Second, to provide a tank hanger for trucks and similar vehicles which can be made of relatively light or thin stock material thus reducing the cost of the hanger.

Third, to provide a modified form of tank hanger for trucks and similar vehicles which permits the fuel tanks to be attached at different levels at the sides of the frame of the truck or vehicle.

Fourth, to provide a tank hanger which effectively supports the weight of a fuel tank and the fuel therein and accommodates flexing and movement of the tank and hanger elements due to vibration and bumping of the vehicle without producing flexing or bending fatigue in the supporting and connecting elements of the hanger system.

Other objects and advantages of the invention will be apparent from the consideration of the following description and claims. The drawings, of which there is one sheet, illustrate a highly practical form of the tank hanger of the invention and one modified form of the hanger adapted to permit variable positioning of the fuel tanks on the frame of a vehicle.

FIG. 1 is a fragmentary side elevational view of the rear end of an automotive truck tractor with a fuel tank secured to the side of the truck frame by the hanger of the invention.

FIG. 2 is a fragmentary top plan view of the connection between the tank hanger and the side frame of the vehicle.

FIG. 3 is a transverse cross sectional view through the tank, tank hanger and truck frame member taken along the plane of the line 3—3 in FIG. 1.

FIG. 4 is a transverse cross sectional view through the clamping connection between the tank retaining strap and the anchor bolt connected to the truck frame taken along the plane of the line 4—4 in FIG. 3.

FIG. 5 is a fragmentary longitudinal cross sectional view taken along the plane of the line 5—5 in FIG. 4.

FIG. 6 is a fragmentary vertical cross sectional view similar to FIG. 3 but illustrating a modified form of tank hanger for supporting the tank at different elevations.

FIG. 7 is a fragmentary cross sectional view taken along the planes of the lines 7—7 in FIGS. 3 and 6.

Automotive trucks, particularly long distance hauling highway trucks, are commonly provided with one or more fuel tanks of considerable capacity and the tanks have been commonly mounted on the side frames of the trucks where the frame is exposed at the side of the vehicle and below any body or towing connection on the truck frame. The tanks and the weight of the fuel therein which is considerable is thereby positioned in off-set or projecting position beyond the side frame member of the truck which supports the tank. As the truck moves along the highway and over bumps and irregularities the tank and its contents tend to bump up and down due to the inertia of the tank and flexing forces are applied to the mounting structure. In the past these flexing forces have created bending motion of parts of the tank supporting or hanger structure and after a sufficient period of time these flexing forces create fatigue in the parts connecting the tank to the truck with the result that the tank breaks loose and falls from the truck creating not only an entirely objectionable situation but one which may be very dangerous due to spillage of the fuel and possible rupturing of the tires of the truck. One possible solution to this problem is to make the tank supporting elements of sufficient thickness and strength to withstand these flexing forces for a longer period of time and to better resist the bending or flexing of the parts but this adds to the expense of the tank hanger as well as increasing the dead weight of the truck.

The present invention permits the use of a minimum amount of metal in the tank supporting parts by eliminating transverse flexing of the thinnest portion of the tank supporting members so that no fatigue forces are created and there is no failure of these parts. In FIG. 1 there is illustrated a portion of a truck having a side frame member 1 of channel shaped cross section with associated rear driving wheels 2 and a trailer connecting hitch plate 3. The tank 4 which is cylindrical is attached to the frame member 1 by a pair of straps 5 constituting part of duplicate tank supporting members to be described.

The tank supporting structure consists first of an upright mounting bar 6 of angle shaped cross section having an inner flange 7 adapted to be secured to the side frame 1 as by the bolts 8. The other and laterally outwardly projecting flange 9 of the mounting bar is provided near its upper end with a hole 10 of substantial size. Secured to the mid-section and extending beyond the lower end of the mounting bar is a concavely curved saddle bar 11 also of angle shaped cross section having an inner flange 12 which is secured by welding as at 13 to the side of the flange 9. The outwardly facing flange 14 of the saddle bar is curved as the segment of a cylinder and conforms to the curvature of the side of the tank 4 to be attached to the truck. The cylindrical curvature is, of course, not critical as other contours of tanks may be provided but it is important that the lower end of the flange 14 project part way underneath the body of the tank as at 15 to have a component of vertical supporting engagement with the tank.

The straps 5 have their lower ends secured to the lower ends 15 of the flanges 14 by welding as at 16 and extend around the outer side of the tank to the inwardly projecting tangential portion 17 above the upper end of the saddle bar. The upper end portion 17 of the retaining strap is desirably reversely folded as at 18 for additional strength and a suitable spacer plate 19 is secured to the top of the tangent portion 17 by welding at 20. The welding also secures a tubular anchor block 21 to the retaining strap in spaced relation above the surface of the tangent end 17 of the strap.

An anchor hook 22 having a hook 23 on one end has a threaded shank 122 which is passed through the anchor block and retained in place by the nut 24. Desirably a lock washer 25 is applied underneath the nut. The hook 23 is engaged through the hole 10 in the flange 9 and the nut 24 is drawn tight to hold the tank against the saddle bar 11. As the tank moves up and down due to its weight and inertia and travel of the truck over bumps, it moves to the positions indicated by the dotted lines at 4A with this movement being accommodated by some flexing of the saddle bar 11 to the position 11B and with some possible movement of the lower end of the mounting bar 6 to the position shown at 6B. These members are of relatively thick cross section and well adapted to accommodate this flexing motion without creating fatigue in the metal. The retaining strap 17 is subjected to varying tension forces and may even stretch slightly in moving to the position 17B but this does not create any objectionable flexing of the retaining strap because the hooked end 23 of the bolt 22 pivots in the hole 10 so that the upper portion 17 of the retaining strap is at all times tangent to the upper surface of the drum. By this expedient the parts of the tank supporting and mounting assembly can be made of minimum strength and weight without sacrificing reliability of the supporting mount.

The modified form of tank support and mount provides a modified upright mounting bar 26 with a flange 27 attachable to the frame 1 of the truck by the same type of bolts 8 as in the first form of the invention. The outwardly projecting flange 28 is provided with a series of vertically spaced holes 29. The lower holes of the series are selectively registerable in pairs with holes formed in the inwardly facing flange 30 of the curved saddle bar 31 so that bolts 32 may selectively secure the saddle bar at different elevations on the mounting bar as is indicated by the alternate position of the saddle bar at 30A. The saddle bar has the same retaining band or strap 5 secured to its lower end as in the first form of the invention and the upper tangential end 17 of the strap carries the same anchor block 21 and hooked bolt 22 for engagement in one of the holes 29 above the tank. In operation the modified tank mount and support functions in the same way as the first form illustrated in FIG. 3. If desired, the flange 26 of the mounting bar may be provided with lightening holes 33 to reduce the amount of weight of the mounting bar.

Either form of the tank support and mounting structure is easily attached to the side frame 1 of a truck and effectively supports the fuel tank with a minimum of metal and without danger of fatigue in the retaining strap causing a failure of the tank support.

What is claimed as new is:

1. A fuel tank hanger for trucks having exposed side frame members comprising, a pair of mounting bars of angled cross section having flanges adapted to be bolted in spaced upright relation to one of said frame members, other flanges on said bars projecting outwardly from said first flanges and having a hole formed near their upper ends, concavely curved saddle bars of angled cross section each having one flange welded to the sides of said other flanges and curved flanges facing concavely outwardly to engage one side and a lower portion of a tank, flexible hanger straps having one end welded to the lower ends of said curved flanges and looped outwardly therefrom, reversely folded opposite ends on said straps having anchor blocks welded thereto with bores formed through the blocks in alined relation to the length of the straps, and hook bolts having threaded ends passed through said bores with nuts on the threaded ends and hooked ends pivotally engageable through said holes.

2. A fuel tank hanger for trucks having exposed side frame members comprising, a pair of mounting bars having flanges adapted to be secured in spaced upright relation to one of said frame members, other flanges on said bars projecting outwardly from said first flanges and having a hole formed near one of their ends, concavely curved saddle bars each having one flange secured to a side of one of said other flanges and a curved flange facing concavely outwardly to engage one side and a lower portion of a tank, flexible hanger straps having one end secured to the ends of said curved flanges at the opposite end from said holes and looped outwardly therefrom, opposite ends on said straps having anchor blocks secured thereto with bores formed through the blocks in alined relation to the length of the straps, and hook bolts having threaded ends passed through said bores with nuts on the threaded ends and hooked ends pivotally engageable through said holes.

3. A tank hanger as defined in claim 2 in which the holes in the mounting bars are at the upper ends of the bars and the anchor blocks and hook bolts are on the correspondingly upper ends of the straps.

4. A tank hanger as defined in claim 2 in which said other flanges of said mounting bars have a series of vertically spaced holes formed therethrough and said first mentioned flanges of said saddle bars have holes formed therethrough to selectively aline with different holes in the mounting bars to receive bolts selectively connecting the saddle bars to the mounting bars at different heights.

5. A tank hanger as described in claim 2 in which said bores in said anchor blocks are of larger diameter than the threaded ends of said hook bolts.

References Cited by the Examiner

UNITED STATES PATENTS

| | | | |
|---|---|---|---|
| 1,074,107 | 9/1913 | Dunham | 224—42.45 |
| 1,210,985 | 1/1917 | Pratt | 248—313 |
| 1,797,873 | 3/1931 | McManus | 280—5 |
| 1,834,511 | 12/1931 | Amdrake | 248—201 |
| 2,410,182 | 10/1946 | Prior | 280—5 |
| 2,902,240 | 9/1959 | La Belle | 248—201 |

CLAUDE A. LE ROY, *Primary Examiner.*